(12) United States Patent
Isenegger

(10) Patent No.: US 12,182,442 B2
(45) Date of Patent: *Dec. 31, 2024

(54) REQUEST CONTROL FOR MEMORY SUB-SYSTEMS

(71) Applicant: Micron Technology, Inc., Boise, ID (US)

(72) Inventor: Laurent Isenegger, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,543

(22) Filed: Feb. 27, 2023

(65) Prior Publication Data

US 2023/0214155 A1 Jul. 6, 2023

Related U.S. Application Data

(63) Continuation of application No. 17/461,701, filed on Aug. 30, 2021, now Pat. No. 11,593,024.

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC ..... G06F 3/0656; G06F 3/0604; G06F 3/0679
USPC ........................................................ 711/154
See application file for complete search history.

(56) References Cited

U.S. PATENT DOCUMENTS

| | | | |
|---|---|---|---|
| 5,956,503 A | 9/1999 | Arimilli et al. | |
| 9,378,787 B2 | 6/2016 | Perego et al. | |
| 9,570,144 B2 | 2/2017 | Brooks et al. | |
| 10,146,574 B1 | 12/2018 | Krivenok et al. | |
| 11,593,024 B1* | 2/2023 | Isenegger | G06F 3/0659 |
| 2005/0232613 A1 | 10/2005 | Iwamoto | |
| 2009/0007110 A1 | 1/2009 | Zhang | |
| 2017/0249191 A1 | 8/2017 | Chang et al. | |
| 2017/0270004 A1* | 9/2017 | Patel | H03M 13/3761 |
| 2018/0095893 A1* | 4/2018 | Dooley | G06F 12/0897 |
| 2019/0251039 A1 | 8/2019 | Modi et al. | |
| 2019/0384700 A1 | 12/2019 | Caraccio et al. | |
| 2021/0200695 A1* | 7/2021 | Magro | G11C 8/12 |
| 2022/0083369 A1* | 3/2022 | Snyder | G06F 13/1642 |

\* cited by examiner

*Primary Examiner* — Than Nguyen
(74) *Attorney, Agent, or Firm* — Brooks, Cameron & Huebsch, PLLC

(57) ABSTRACT

A request can be provided, from a front-end of a memory sub-system, to a processing device of the memory sub-system and deleting the request from a buffer of the front-end of the memory sub-system. Responsive to deleting the request from the buffer, determining a first quantity of requests in the buffer and responsive to deleting the requests from the buffer, determining a second quantity of outstanding requests in the back-end of the memory sub-system. Responsive to deleting the request from the buffer and providing the request to the processing device, determining whether to provide a response to a host, wherein the response includes an indication of the quantity of requests in the buffer and of outstanding requests in a back-end of the memory sub-system, based on a comparison of the second quantity of outstanding requests to a threshold.

20 Claims, 6 Drawing Sheets

REQUEST CONTROL FOR MEMORY SUB-SYSTEMS

PRIORITY INFORMATION

This application is a Continuation of U.S. application Ser. No. 17/461,701, filed on Aug. 30, 2021, and will issue as U.S. Pat. No. 11,593,024 on Feb. 28, 2023, the contents of which are incorporated herein by reference.

TECHNICAL FIELD

Embodiments of the disclosure relate generally to memory sub-systems, and more specifically, relate to controlling requests provided to a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
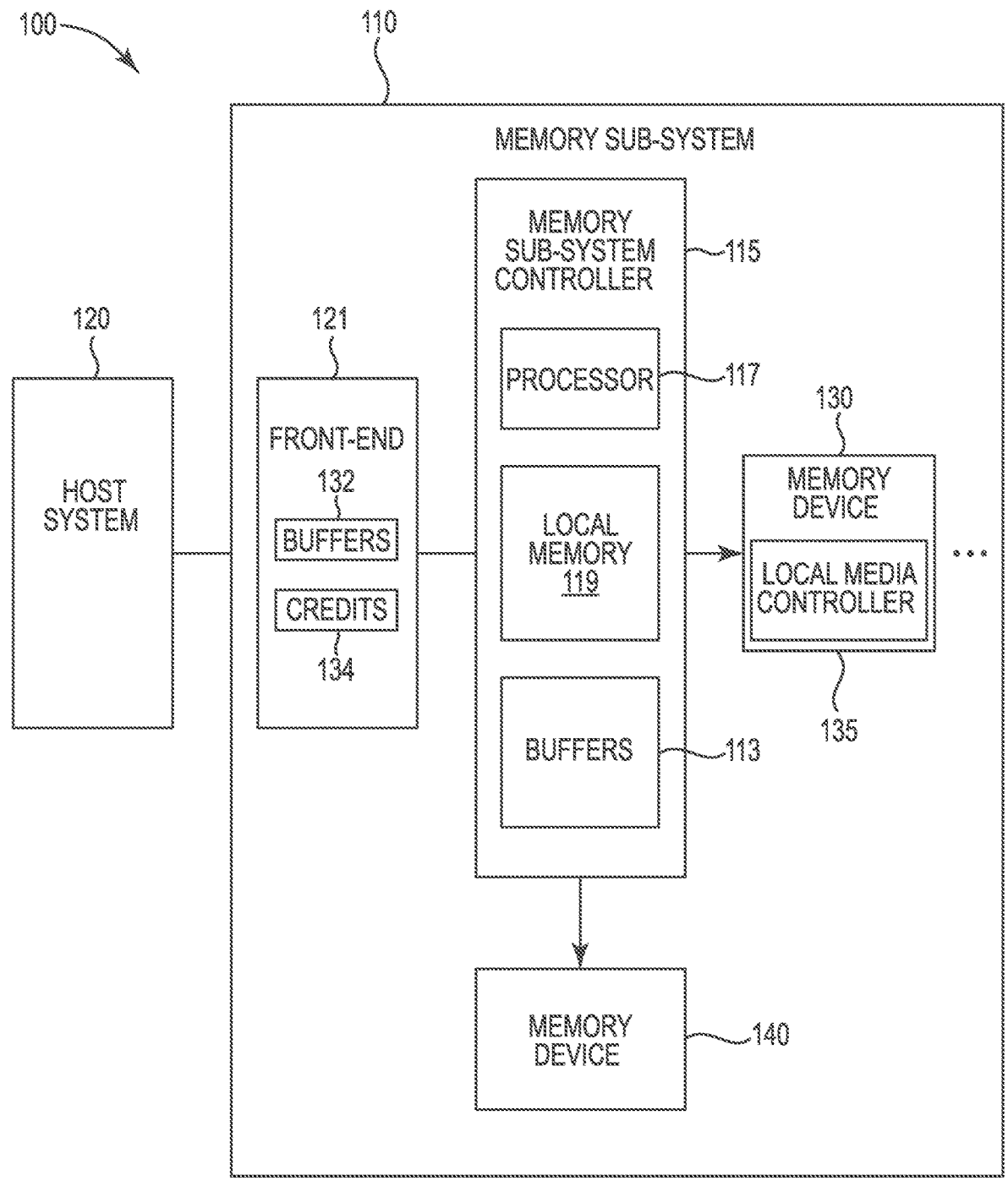
FIG. 1 illustrates an example computing system that includes a memory sub-system in accordance with some embodiments of the present disclosure.

Aspects of the present disclosure are directed to controlling requests provided to a memory sub-system, in particular to memory sub-systems that include a front-end of a memory sub-system for throttling traffic between a host and the memory sub-system. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

The front-end (e.g., front-end interface) of a memory system can include a control flow mechanism to verify that whenever the sender wants to send data the receiver has buffer space available to receive the data. Controlling the receipt of data can be referred to as throttling data or throttling commands. Data throttling can be accomplished with a credit-based mechanism where the receiver periodically notifies the sender how many credits are available. The number of credits can represent a number of buffer slots available for receipt of data, commands, and/or addresses in the receiver. The sender can stop sending additional data when the sender detects that no more credits are available until more credits are received back from the receiver.

In various memory sub-systems, the front-end of the memory sub-system can be connected to a media controller which can then access a variety of media types including DRAM, 3DXP, and/or NAND, among others (e.g., emerging memories). When the front-end of the memory sub-system sends the read or write request to the media controller (e.g., back-end of the memory sub-system), the buffer in the front-end of the memory sub-system is freed. Once the buffer is freed from one or more of the read or write requests, the receiver can notify the sender that additional credits are available.

However, as the host system provides requests without restraint the buffers implemented in the back-end of memory sub-system can become backlogged with requests such that a latency of the execution of the commands from the time the commands are received from the host system may increase as the quantity of requests stored in the buffers of the back-end increases. For example, as the front-end buffers are freed due to providing the requests to a controller of a memory sub-system, the buffers of the back-end may begin to become saturated such that the latency of the execution of operations corresponding to the requests can increase. Increasing the execution latency of the commands can affect the efficiency of the host system. That is, the host system may wait for the execution of the commands provided to the memory sub-system such that the host system is inefficient.

Aspects of the present disclosure address the above and other deficiencies by implementing a control mechanism in a front-end of a memory sub-system to throttle the receipt of commands from a host system utilizing a plurality of thresholds. In various instances, the front-end of the memory sub-system can reduce the backlog of the back-end buffers by signaling to the host not to provide additional requests. The front-end can utilize a first threshold and a second threshold to indicate to the host an appropriate time for providing requests to the memory sub-system. For instance, the front-end of the memory sub-system can signal to the host not to provide requests given that the quantity of the requests in the back-end is greater than the first threshold. The front-end of the memory sub-system may not signal to the host to provide requests until after the quantity of requests in the back-end is less than a second threshold where the first threshold is greater than the second threshold.

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Interfaces such as peripheral component interconnect express (PCIe), compute express link (CXL), cache coherent interconnect for accelerators (CCIX), etc. allow connecting a variety of memory devices to a host system. The combination of interfaces and memory technology improvements can allow for deploying "far memory", which can consist of system memory (e.g., memory devices) being implemented behind a front-end of a memory sub-system such as PCIe, CXL, CCIX, GenZ., etc. As used herein, the front-end of the memory sub-system can also be referred to as an interface of the memory sub-system or as a front-end of a controller of the memory sub-system. As used herein, the front-end of the memory sub-system can comprise hardware and/or firmware configured to receive data (e.g., requests and/or data) and provide the data to a back-end of the memory sub-system. The back-end of the memory sub-system can comprise hardware and/or firmware to receive the data (e.g., requests and/or data) from the front-end of the memory sub-system and can include perform the requests provided from the host on the memory devices of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include interface circuitry (e.g., front-end 121) to communicate with the host system 120. The front-end 121 can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffers (e.g., DRAM) 113 and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a front-end circuitry 121, referred to herein as front-end 121. Although not shown in FIG. 1 so as to not obfuscate the drawings, the front-end 121 can include various circuitry to throttle requests and/or data received by the host system 120. In some embodiments, the front-end 121 can include special purpose circuitry in the form of an ASIC, FPGA, state machine, and/or other logic circuitry that can allow the front-end 121 to orchestrate and/or perform operations to selectively perform request and/or data throttling for the memory sub-system 110 based on a credit based system. Although the front-end 121 is shown as being separate from the memory subs-system controller 115, the front-end 121 can be part of the memory sub-system controller 115 such that the rest of the memory sub-system controller 115 is referred to as a back-end of the memory sub-system controller 115. For example, the back-end can include the processor 117, the local memory 119, and/or the buffers 113. In various examples, the back-end can also include channel controllers to implement the requests stored in the buffer 113.

In various examples, a number of credits 134 can be adjusted and returned based on the number of outstanding requests stored in a buffer of the front-end 121. As used herein, the credits 134 can represent quantity of requests and/or data stored in a buffer 132 of the front-end 121. For example, the credits 134 can represent that there are X requests stored in the buffer 132 of the front-end 121. The credits can also represent that there are Y spaces in the buffer 132 of the front-end 121 available to store requests and/or data. A representation of the spaces in the buffer 132 of the front-end 121 available to store requests and/or data can also represent a quantity of spaces in the buffer 132 that are not available to store requests and/or data which includes a quantity of requests stored in the quantity of spaces in the buffer 132 that are not available to store requests. For example, 0-credits can represent that there are not spaces in the buffer 132 of the front-end 121 available to store requests.

When the memory sub-system 110 is not saturated, the front-end 121 (e.g., front-end interface) can operate as usual, using the buffer 132 space of the front-end 121 available to return the credits 134. The front-end 121 can include a counter that tracks how many requests are outstanding (e.g., outstanding requests in the back-end) in the buffers 113. Once this counter reaches a threshold (e.g., T_A), the front-end 121 can refrain from returning credits 134 to the host 120. That is, the front-end 121 can refrain from returning credits 134 to the host 120 even if more buffer slots in the buffer 132 become available after the counter has reached T_A. The front-end 121 can resume returning credits 134 once the number of outstanding requests is less than a threshold T_B such that the counter 134 is less than T_B which is less than T_A. In such examples, the counter 134 can count up (e.g., increment) as the buffers 113 store additional requests and can count down as the buffers 113 are freed from storing requests.

In various examples, incoming traffic can be throttled once the front-end 121 detects that the memory sub-system controller 115 is nearing saturation. The front-end 121 can utilize existing infrastructure and messages to throttle incoming traffic. Throttling incoming traffic based on the saturation of the memory sub-system controller 115 can provide for better average read latency and better utilization of resources in the back-end. The memory sub-system controller 115 can be saturated when the buffers 113 are saturated.

The buffers 113 can represent a number of buffers each corresponding to a different one of the memory device 130 and the memory device 140. For example, a first buffer of the buffers 113 can correspond to the memory device 130 while a second buffer of the buffers 114 corresponds to the memory device 140. The buffers 113 can store requests and/or data provided from the front-end 121 and corresponding to the memory device 130 and/or the memory device 140. For example, the first buffer can store requests corresponding to the memory device 130 while the second buffer can store requests corresponding to the memory device 140. The buffers 113 can be saturated if the buffers 113 are full and there are not additional slots available to store requests and/or data in the buffers 113. The buffers 113 can also be saturated is the quantity of requests and/or data stored in the buffers 113 causes a latency, for request execution, to increase beyond an acceptable level which can be described using a latency threshold, for example.

The front-end 121 can also include dedicated read and write counters in order to dynamically adjust the thresholds T_A and T_B. Separate read counters and write counters can be used if the memory sub-system 110 provides for asymmetrical performance between read operations and write operations. For example, the memory sub-system 110 can have a write operation performance that is lower than a performance of read operations. If incoming traffic into the memory sub-system 110 is biased towards write requests as oppose to read requests, then the memory sub-system controller 115 can saturate earlier. If the incoming traffic is biased towards read requests as compared to write requests, then the memory sub-system controller 115 can process additional requests before becoming saturated.

What constitutes a biasing of read requests and/or write requests can be set by the front-end 121. The thresholds T_A and T_B can be adjusted based the biasing of read requests and/or write requests. The thresholds T_A and T_B can be biased in order to maximize the utilization of the memory sub-system controller 115 without saturating the memory sub-system controller 115. The maximization of the utilization of the memory sub-system controller 115 can provide for an optimization of a performance of the memory sub-system 110. The front-end 121 can set T_A and T_B based on whether the execution of read operations corresponding to read requests utilize more resources of the memory sub-system 110 or the execution of write operations corresponding to write requests utilize more resource of the memory sub-system 110.

Figure 2:
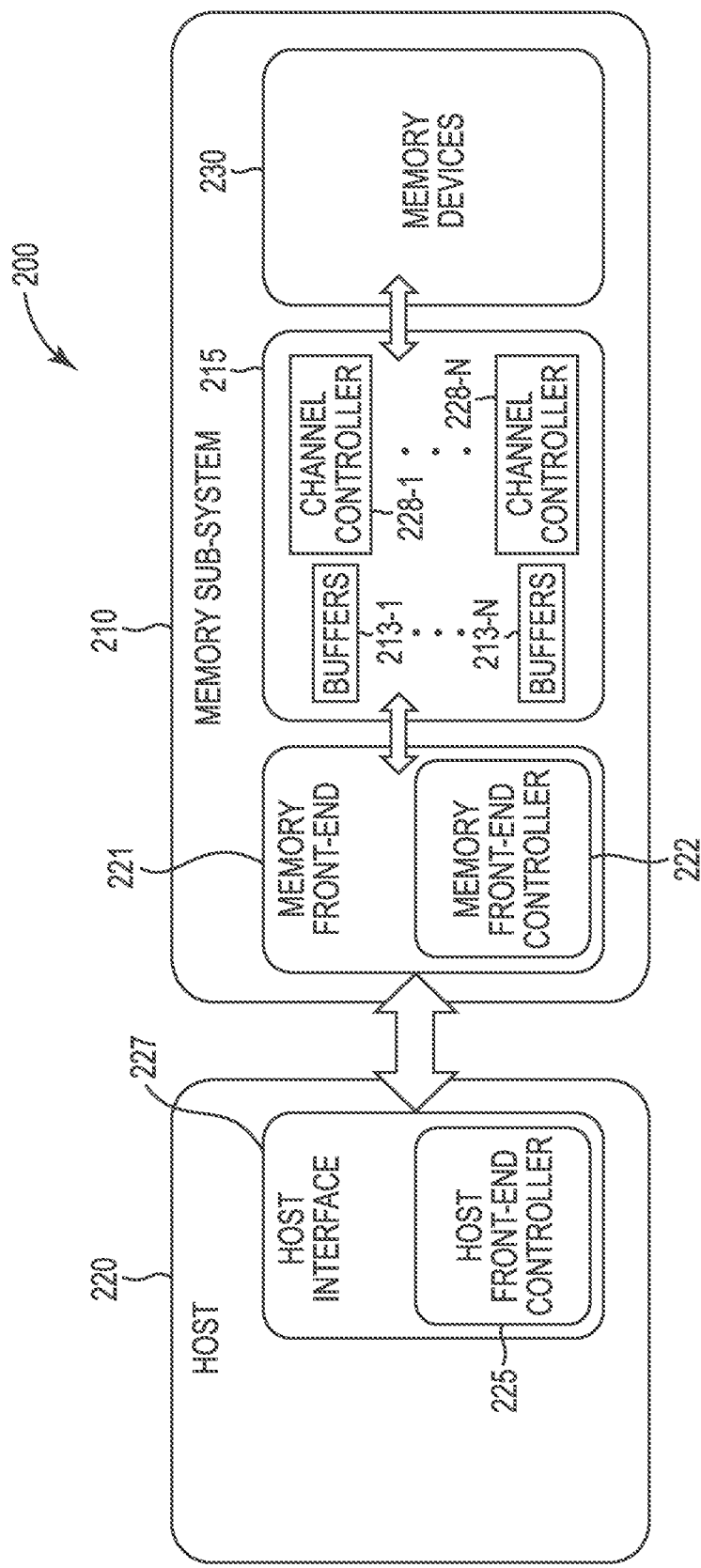
FIG. 2 illustrates an example computing system that includes a memory sub-system in accordance with some embodiments of the present disclosure.

FIG. 2 illustrates an example computing system 200 that includes a memory sub-system 210 in accordance with some embodiments of the present disclosure. The computing system 200 includes the host 220 and the memory sub-system 210. The host 220 can include interface circuitry 227 while the memory sub-system 210 includes front-end circuitry 221. The interface circuitry 227 can also be referred to as an interface 227. The front-end circuitry 221 can also be referred to as front-end 221. The memory sub-system 210 further includes a controller 215 (e.g., memory sub-system controller) and memory devices 230. Although the memory devices are labeled 230 the memory devices 230 can include volatile and non-volatile memory devices (e.g., memory devices 130, 140 in FIG. 1). The host 220 can be coupled to the memory sub-system 210 via a physical interface including hardware components to transfer data between the host 220 and the memory sub-system 210. In various examples, the communications between the host 220 and the memory sub-system 210 can be CXL compliant.

The front-end 221 can receive commands from the host 220. The interface 227 can receive commands from the memory sub-system 210. The front-end 221 can include controller 222 (e.g., memory front-end controller). The interface 227 can also include a controller 225 (e.g., host interface controller).

The controllers 222, 225 can also be described as a processing device (e.g., processor). The controllers 222, 225 can include hardware such as one or more integrated circuits and/or discrete components, a buffer memory, or a combination thereof. The hardware can include digital circuitry with dedicated (i.e., hard-coded) logic to perform the operations described herein. The controllers 222, 225 can be a microcontroller, special purpose logic circuitry (e.g., a field programmable gate array (FPGA), an application specific integrated circuit (ASIC), etc.), or other suitable processor.

In various examples, the controller 215 can include the front-end 221 such that the front-end 221 can be described as a front-end of the controller 215. The back-end of the memory sub-system 21—can include the controller 215.

The front-end 221 can receive data from the host 220 including requests. The controller 222 can access the requests received by the front-end 221. The controller 222 can store the requests in a buffer (e.g., buffer memory). The controller 215 can access the requests stored in the front-end 221 (e.g., buffer of the front-end). The controller 215 can receive the requests such that the front-end 221 pushed the requests to the controller 215 or the controller 215 can pull the requests. The controller 215 can store the requests in one of buffers 213-1 to 213-N, referred to as buffers 213. Each of the buffers 213 can correspond to a different one of the memory devices 230. Each of the buffers 213 can store requests having addresses of memory cells which are in the memory devices 230. For example, the buffer 213-1 can store requests having addresses of memory cells which are in a first one of the memory devices 230. As such, the size of the buffers 213 collectively can be greater than the size of the buffers of the front-end 221.

The controller 215 can include channel controllers 228-1 to 228-N that perform the requests stored in the buffers 213. Each of the channel controllers 228-1 to 228-N can implement the requests for a different one of the memory devices 230.

The controller 222 can clear requests from the buffers of the front-end 221 once the controller 222 provides requests from the buffer of the front-end 221 to the to the controller 215. Clearing the requests from the buffer of the front-end 221 can make is appear as if the memory sub-system 210 can receive additional requests when in fact the back-end of the memory sub-system 210 is saturated given that the buffers 213 may be saturated. As used herein, a buffer 213 can be saturated if the quantity of requests stored in the buffer 213 is greater than a threshold.

In order to provide requests from the front-end 221 to the controller 215 in a manner that does not cause the buffers 213 to be saturated, the controller 222 can track the requests stored in the buffers 213 and can indicate to the host 220 to send additional requests if the quantity of requests stored in the buffers 213 is less than T_A. Once the quantity of requests stored in the buffers 213 is greater than T_A the controller 221 refrain from indicating to the host 220 to provide additional requests until the quantity of requests stored in the buffers 213 is less than T_B, where T_A is greater than T_B. Refraining from signaling to the host 220 to provide additional request until the quantity of requests stored in the buffers 213 is less than T_B can allow the back-end of the memory sub-system 210 to process more requests without the memory sub-system 210 receiving additional requests and thus freeing space from the buffers 213 and reducing a latency of processing the requests stored in the buffers 213.

In various instances, the controller 222 can indicate whether the host 220 can provide additional requests based on whether the controller 225 has previously indicated that it is available to receive additional communications. For instance, the controller 225 can indicate to the memory sub-system 210 that it is not ready to receive additional data responsive to which the controller 222 can refrain from providing an update on the credits available to the host 220, where the credits indicate whether the host 220 can send additional requests.

The controller 225 can also include buffers that store data provided by the memory sub-system 210. The controller 225 can track the space in the buffers of the interface 227 available to store additional data received from the memory sub-system 210. The controller 225 can indicate availability to receive additional data to the memory sub-system 210 based on availability of the buffer of the interface 227 to store additional data.

Figure 3:
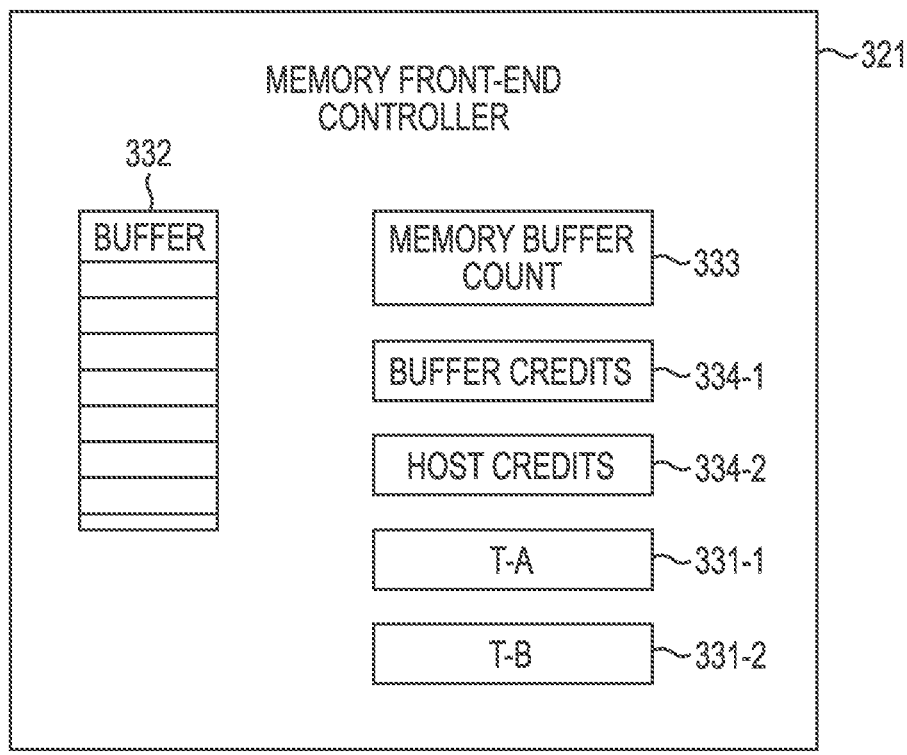
FIG. 3 is a block diagram of an example memory front-end controller and a host interface controller in accordance with some embodiments of the present disclosure.
Figure 3:
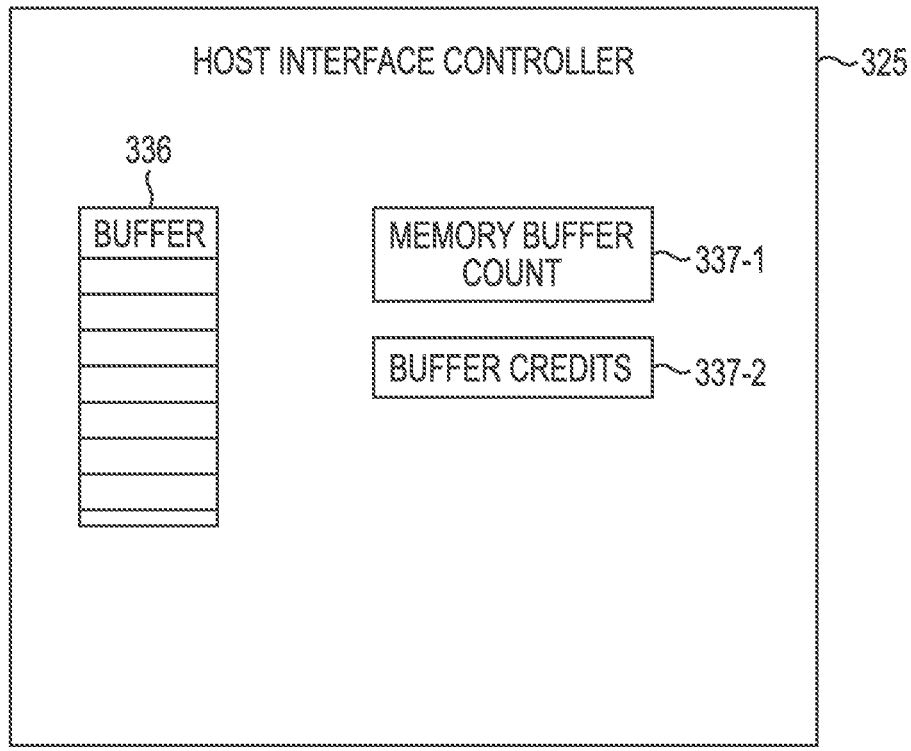

FIG. 3 is a block diagram of an example memory front-end controller 321 and a host interface controller 325 in accordance with some embodiments of the present disclosure. The memory front-end controller 321 can be referred to as controller 321. The controller 321 can include a buffer 332, a count 333 (e.g., as provided by a memory buffer counter), credits 334-1 (e.g., buffer credits), and credits 334-2 (e.g., host credits 334). The controller 321 can also include thresholds 331-1, 331-2 also referred to as T_A 331-1 and T_B 331-2. The host interface controller 325 can also be referred to as controller 325. The controller 325 can include buffer 336, credits 337-1 (e.g., memory credits), credits 337-1 (e.g., buffer credits).

The buffer 332 can store data provided by the host. For example, the buffer 332 can store requests provided by the host. The controller 321 can track the quantity of requests stored in the buffer 332. The controller 321 can utilize the credit 334-1 to store a representation of the quantity of requests stored in the buffer 332. The credits 334-1, the credits 334-2, the count 333, T_A 331-1, and T_A 331-2 can be stored in memory of the controller 321 such as in a registers or other types of memory. The credits 337-1 and the credits 337-2 can be stored in memory of the controller 321 such as in a registers or other types of memory.

The controller 321 can utilize the count 333 to update and/or determine whether to provide the credits 334-1 to the host. The credits 334-1 can refer to the credits corresponding to the buffer 332 as opposed to the credits 334-2 which refer to the credits corresponding to the host. The credits 334-1 can be used to convey whether the memory sub-system can receive additional requests and/or how many more additional requests the memory sub-system can receive. In various examples, the credits 334-1 can increase to convey that no additional requests can be received or can decrease to convey that no additional requests can be received. For example, no more requests can be received by the memory sub-system once the credits 334-1 reach a 0-value. If the credits 334-1 have a 1-value, then the memory sub-system can receive a Y quantity of requests. If the credits 334-1 have a 2-value, then the memory sub-system can receive a Z quantity of requests, where Z is greater than Y.

The controller 321 can utilize the credits 334-2 to track whether the controller 321 can cause data to be sent to the host. For example, the controller 321 can store the credits received from the host as credits 334-2. The controller 321 can determine whether to provide the credits 334-1 based on the credits 334-2. If the credits 334-2 have a non-zero value, then the controller 321 can provide data to the host and decrement the credits 334-2 by a value corresponding to the amount of the data. The controller 321 can refrain from providing data to the host if the credits 334-2 have a 0-value.

The controller 321 can also refrain from providing the credits 334-1 to the host if the credits 334-2 have a 0-value. In various instances, the controller 321 can provide the credits 334-1 to the host even if the credits 334-2 have a 0-value based on whether a duration of time has passed since the controller 321 provided the credits 334-1 to the host, the duration of time being greater than a threshold duration of time. Providing the credits 334-1 if a duration of time has passed since the credits 334-1 where previously provided can be referred to as a timeout scheme. As such, the credits 334-1 can be provided if the credits 334-1 time out.

In various instances, the controller 321 can set the credits 334-1 based on the counts 333, T_A 331-1, and T_B 331-2. For instance, if the count 333 is greater than or equal to T_A 331-1, then the controller 321 can set the credits 334-1 to a 0-value. If the count 333 is less than T_A 331-1 but greater than T_B 331-2 after previously having been greater than or equal to T_A 331-1, the credits 334-1 can be set to a 0-value and/or may not be provided to the host leaving the host with the impression that the credits 334-1 have a 0-value. As used herein, the phrase "after previously having been greater than or equal to T_A 331-1" describes the count 333 after being greater than T_A 331-1 but before being less than T_B 331-2. The controller 321 can provide the credits 334-1 to the host if the count 333 are less than T_B 331-2. After the count 333 is less than T_B 331-2, the controller 321 can continue to update the credits 334-1 and/or provide the credits 334-1 to the host until the count 333 is once again greater than T_A.

The controller 325 can also track the slots of the buffer 336 that are available to receive data in much the same way the controller 321 tracks the slots of the buffer 332. That is, the controller 325 can utilize credits 337-2 to track the quantity of slots available in the buffer 336 to store data or the quantity of slots that currently store data in the buffer 336. The controller 325 can store the credits receive from the memory sub-system as credits 337-1. The controller 325 can provide the credits 337-2 to the memory sub-system.

In various instances, the controllers 321, 325 can provide the credits 334-1 and 337-2 utilizing one of a plurality of responses. For example, the controller 321, 325 can be provided utilizing a data response (DRS) or a non-data response (NDR). For example, the credits 334-1 and 337-2 can be provided as metadata to the DRS or the NDR, among other types of communications between the host and the memory sub-system.

In various examples, the controller 321 can set the T_A 331-1 and the T_B 331-2. For example, the controller 321 can set T_A 331-1 and T_B 331-2 based on characteristics of the memory sub-system. The controller 321 can also set T_A 331-1 and T_B 331-2 based on the quantity of requests provided to the back-end of the memory sub-system and/or the saturation level of the back-end of the memory sub-system. In various instances, the T_A 331-1 and the T_B 331-2 can be hardcoded into the hardware. The T_A 331-1 and the T_B 331-2 can be programmed utilizing firmware or utilizing dedicated host software.

Figure 4:
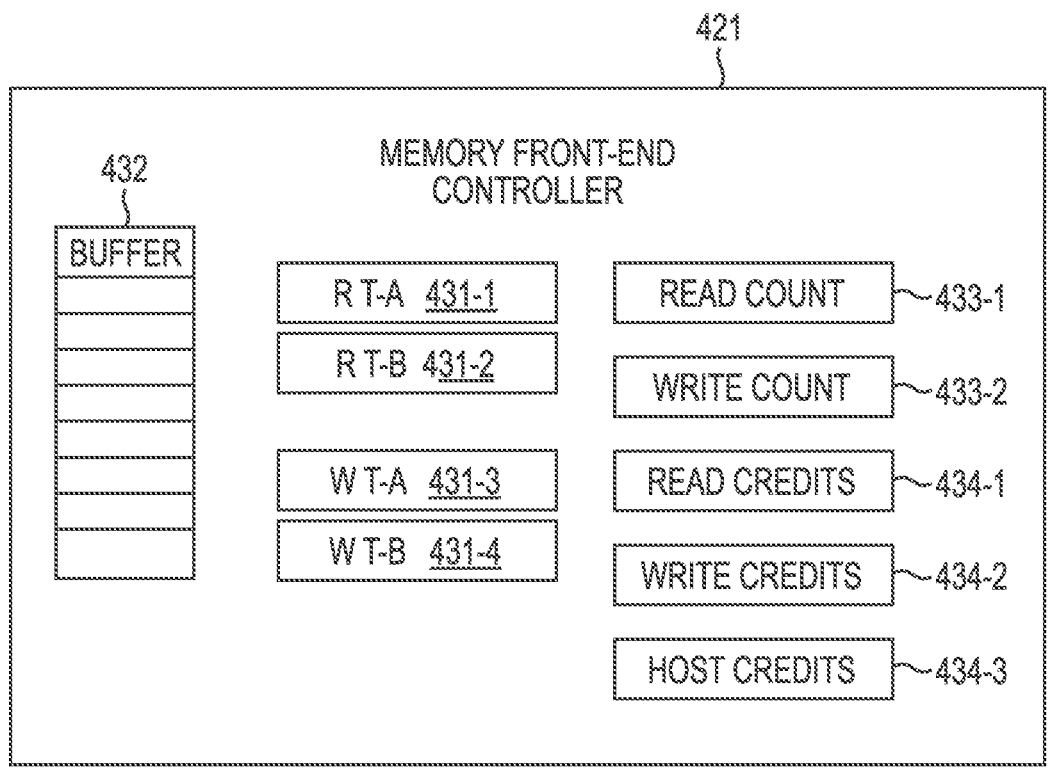
FIG. 4 is a block diagram of an example memory front-end controller in accordance with some embodiments of the present disclosure.

FIG. 4 is a block diagram of an example memory front-end controller 421 in accordance with some embodiments of the present disclosure. The controller 421 can include the buffer 432, count 433-1 (e.g., read count), count 433-2 (e.g., write count), credit 434-1 (e.g., read credit), credit 434-2 (e.g., write credit), credits 434-3 (e.g., host credits), and thresholds 431-1, 431-2, 431-3, 431-4. The threshold 431-1 can be referred to as RT_A 431-1 while the threshold 431-2 is referred to as RT_B 431-2. The threshold 431-3 can be referred to as WT_A 431-3 while the threshold 431-4 is referred to as WT_B 431-4. The thresholds 431-1, 431-2, 431-3, 431-4 can also be referred to as thresholds 431.

In the example provided in FIG. 4, the controller 421 can track the quantity of read requests and the quantity of write requests stored in the buffers of the back-end of the memory sub-system. For example, the quantity of read requests stored in the back-end of the memory sub-system can be tracked utilizing the count 433-1. The quantity of write requests stored in the back-end of the memory sub-system can be tracked utilizing the count 433-2. The counts 433-1, 433-2 can represent a quantity of read requests and write requests stored in the buffers of the back-end, respectively.

Each of the counts 433-1, 433-2 can be associated with multiple of the RT_A 431-1, RT_B 431-2, WT_A 431-3, and WT_B 431-4. For example, the RT_A 431-1 and RT_B 431-2 are associated with the count 433-1. The WT_A 431-3 and WT_B 431-4 are associated with the count 433-2.

The memory sub-system can generate the credits 434-1 and the write credits 434-2. The memory sub-system can also receive and store the host credits 434-3. The controller 421 can generate the credits 434-1 based on the quantity of read requests stored in the buffer 432. The controller 421 can generate the credits 434-2 based on the quantity of write requests stored in the buffer 432. The credits 434-1, 434-2 can be utilized to signal to the host whether the host can provide additional read requests or write requests separately. For example, the credits 434-1, 434-2 can be provided to the host such that the host refrains from providing write requests but continues to provide read requests. The controller 421 can also provide the credits 434-1, 434-2 to the host such that the host provides write requests and read requests to the memory sub-system. The controller 421 can further provide the credits 434-1, 434-2 to the host such that the host refrains from providing both read request and write requests. The controller 421 can also provide the credits 434-1, 434-2 to the host such that the host provides read requests but refrains from providing write requests to the memory sub-system.

The controller 421 can generate the credits 434-1 using the count 433-1, the RT_A 431-1, and RT_B 431-2. In much the same way the controller 321 generated the buffer credits 334-1 utilizing the count 333, the T_A 331-1, T_B 331-2 in FIG. 3. The controller 421 can determine whether the count 433-1 is greater than RT_A 431-1. If the count 433-1 is greater than or equal to RT_A 431-1 then the controller 421 can set the credits 434-1 to a 0-value and/or can refrain from providing the credits 434-1 to the host. If the count 433-1 is less than RT_A 431-1 but greater than RT_B 431-2 after being greater than or equal to RT_A 431-1, then the controller 421 can set the credits 434-1 to a 0-value and/or can refrain from providing the credits 434-1 to the host. The controller can set the credits 434-1 to a non-zero value if the count 433-1 is less than or equal to RT_B 431-2.

The controller 421 can generate the credits 434-2 using the count 433-2, the WT_A 431-3, and WT_B 431-4. The controller 421 can determine whether the count 433-2 is greater than WT_A 431-3. If the count 433-2 is greater than or equal to WT_A 431-3 then the controller 421 can set the credits 434-2 to a 0-value and/or can refrain from providing the credits 434-2 to the host. If the count 433-2 is less than WT_A 431-3 but greater than WT_B 431-4 after being greater than or equal to WT_A 431-3, then the controller 421 can set the credits 434-2 to a 0-value and/or can refrain from providing the credits 434-2 to the host. The controller can set the credits 434-2 to a non-zero value if the count 433-2 is less than or equal to WT_B 431-4.

In many instances, the controller 421 can set the thresholds 431. For example, the controller 421 can update any one of the thresholds 431 without updating others of the thresholds 431. For instance, the controller 421 can update RT_A 431-1 without updating RT_B 431-2, WT_A 431-3, or WT_B 431-4. The controller can also, for example, update WT_A 431-3 and WT_B 431-4 without updating RT_A 431-1 and RT_B 431-2. The controller 421 can update the thresholds 431 based on characteristics of the memory sub-system and/or a current usage of the memory sub-system. The controller 421 can also update the thresholds 431 based on characteristics of the controller of the memory sub-system and/or the memory devices. The controller 421 can update the thresholds 431 based on a usage of the controller of the memory sub-system and/or the memory devices.

Figure 5:
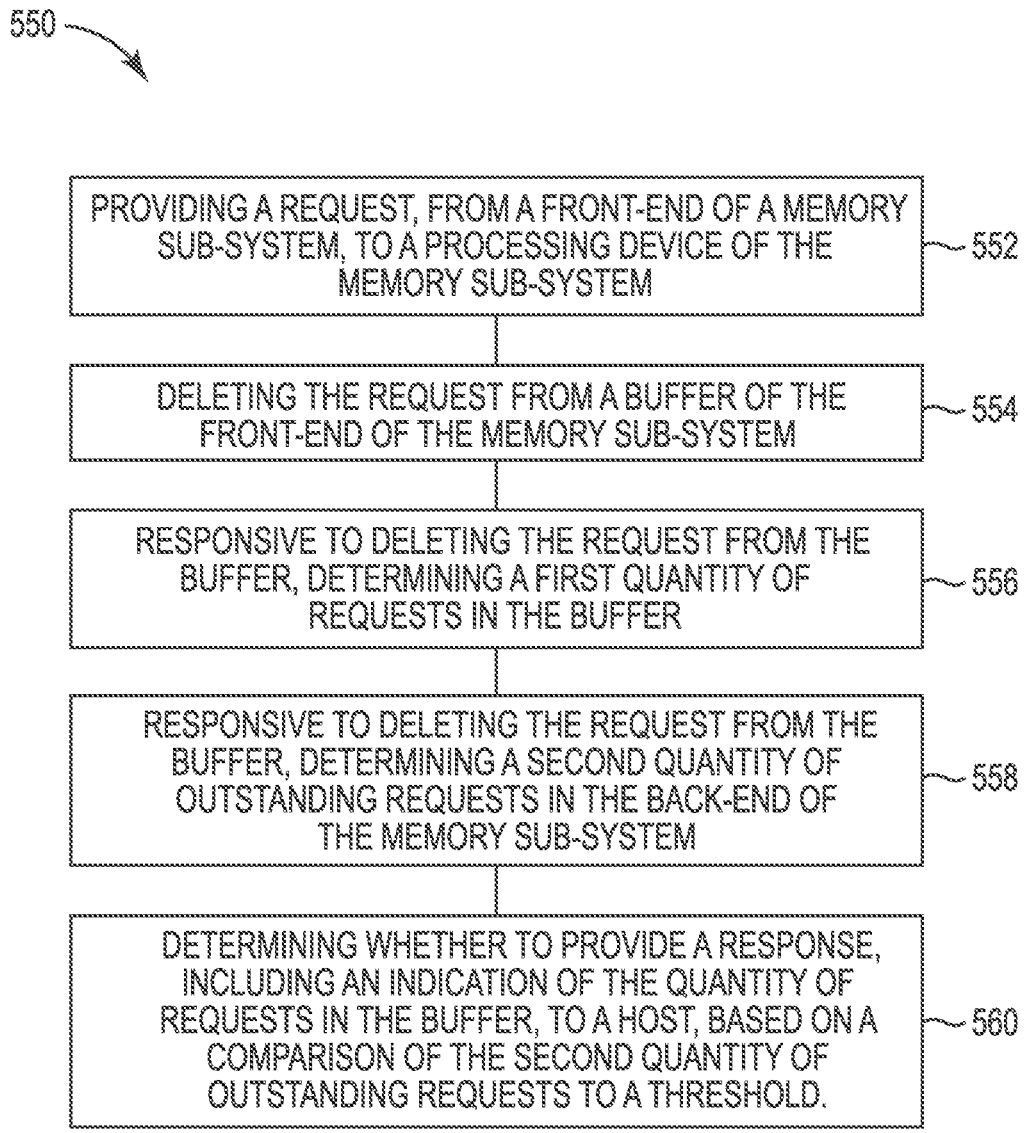
FIG. 5 is a flow diagram corresponding to a method for controlling requests provided to a memory sub-system in accordance with some embodiments of the present disclosure.

FIG. 5 is flow diagram corresponding to a method 550 for controlling requests provided to a memory sub-system in accordance with some embodiments of the present disclosure. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the front-end 121 of the memory sub-system 110 FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 551, a request can be provided from a front-end of a memory sub-system to a processing device of the memory sub-system. That is, the request can be provided from a front-end of a memory sub-system to a back-end of the memory sub-system including a controller of the memory sub-system. As such, the controller of the back-end of the memory sub-system can receive the request provided by the front-end of the memory sub-system.

At operation 552, the request can be deleted from a buffer of the front-end of the memory sub-system. The request can be deleted responsive to providing the request to the processing device of the memory sub-system. In various instances, the request can be provided to the back-end of the memory sub-system responsive to deleting the request from the front-end of the memory sub-system. Deleting the request from the buffer frees up one or more slots of the buffer used to store the request.

At operation 553, responsive to deleting the requests from the buffer, a quantity of request in the buffer can be determined. The front-end of the memory sub-system can count the quantity of request in the buffer or the quantity of slots of the buffer utilized to store requests. As used herein, a buffer can be subdivided into slots. A slot can be, for example, a memory cell or a register the combination of which comprises a buffer.

At operation 554, responsive to deleting the request from the buffer, a second quantity of outstanding requests in the back-end of the memory sub-system can be determined. The second quantity of outstanding request can be stored in a plurality of buffers of the back-end of the memory sub-system.

At operation 556, a determination can be made as to whether to provide a response, including an indication of the quantity of requests in the buffer, to a host based on a comparison of the second quantity of outstanding requests to a threshold. The response can include an indication of the quantity of requests stored in the buffer and of outstanding requests in a back-end of the memory sub-system. For example, the response can include credits which can represent the quantity of request stored in the buffer and/or an availability of the buffer of a front-end to store additional requests. The quantity of requests can indicate whether the host can provide additional requests to the memory sub-system. The quantity of requests can also indicate whether the memory sub-system is available to receive additional requests from the host.

Responsive to determining that the second quantity of outstanding requests stored the buffers of the back-end are greater than the threshold, the front-end of the memory sub-system can refrain from providing the response and/or can set a credit to a 0-value. In various instances, setting the credit to a 0-value can have the same effect as refraining from providing the response including the credits which includes dissuading the host from providing additional requests.

Responsive to determining that the second quantity of outstanding requests in the buffers of the back-end is less than the threshold but greater than a different threshold after the second quantity of outstanding requests in the buffers of the back-end had previously been greater than the threshold, the front-end of the memory sub-system can refrain from providing the response. The front-end of the memory sub-system can also set a credit to a 0-value to dissuade the host from providing additional requests. In various instances, the front-end of the memory sub-system c an set the credits to a 0-value and can provide the credits to the host. Responsive to determining that the second quantity of outstanding requests stored in the buffers of the back-end is less than the threshold and less than the different threshold after the quantity of requests in the buffer had previously been greater than the threshold, providing the response to the host and updating the credits to a non-zero value. The first quantity of requests and the second quantity of outstanding requests can indicate to the host whether the host can provide additional requests to the memory sub-system.

In various instances, determining the second quantity of outstanding requests stored the back-end further comprises incrementing a count. Determining the second quantity of outstanding requests in the back-end can further compromise determining a saturation of the back-end. The back-end can be determined to be saturated if the count has a value equal to or greater than the threshold. A plurality of different buffers of the back-end can also be determined to be saturated if the count has a value equal to or greater than the threshold.

The requests provided by the host can be received at the front-end of the memory sub-system via a CXL link (e.g., an interface that is CXL compliant). The host can be coupled to the memory sub-system. Responsive to receipt of the request, the request can be stored in the buffer of the front-end of the memory sub-system. Responsive to storing the request in the buffer, a different count can be incremented. The different count can represent the quantity of requests stored in the buffer. The different count can be updated responsive to storing requests in the buffer or responsive to deleting requests from the buffer of the front-end. In various instances, the response can include the different count as the indication of the quantity of requests in the buffer.

In various instances, a request can be provided from the front-end of the memory sub-system to a back-end of the memory sub-system. The request can be deleted from a buffer of the processing device of the front-end of the memory sub-system. Responsive to deleting the request from the buffer, a quantity of read requests in the back-end and a quantity of write requests in the back-end can be determined.

Responsive to deleting the request from the buffer and providing the request to the back-end, a determination can be made as to whether the quantity of read requests is greater than a first threshold or whether the quantity of write requests is greater than a second threshold. Responsive to determining that the quantity of read requests is greater than the first threshold or that the quantity of write requests is greater than the second threshold, a processing device of a front-end of a memory sub-system can refrain from providing, to a host, an indication of the quantity of requests stored in the buffer.

Responsive to determining that the quantity of read requests is less than the first threshold and greater than a third threshold or that the quantity of write requests is less than the second threshold and greater than a fourth threshold, the processor can refrain from providing the indication of the quantity of requests stored in the buffer of the host if the quantity of read requests was previously greater than the first threshold or the quantity of write requests was previously greater than the second threshold. The read requests can be treated differently than the write requests. For example, the counts corresponding to the read requests can be different than the counts corresponding to the write requests which can influence whether the host provides additional read requests or write requests.

Responsive to determining that the quantity of read requests is less than the first threshold and less than a third threshold and that the quantity of write requests is less than the second threshold and less than a fourth threshold, the processor can provide a number of credits corresponding to the quantity of requests stored in the buffer of the front-end. The request comprising the number of credits can be provided to the host as metadata. The metadata can accompany a body of a response or can be provided via a response without a body. For example, a response can be provided with the metadata comprising the credits without a body of the response if the response is provided due to a time out of the front-end of the memory sub-system.

If the front-end of the memory sub-system times out, then a response can be provided responsive to receipt of a number of requests. The responses can also be provided responsive to receipt of a request that was the last request deleted from a buffer of the memory front-end controller. The response can also be provided responsive to receipt of a request that was the last request provided to the controller of the memory sub-system. The response can also be provided response to receipt of a request that was not the last request deleted from the buffer of the memory front-end controller. The response can also be provided responsive to receipt of a request that was not the last request provided to the controller of the memory sub-system.

In various instances the quantity of read requests can indicate whether the back-end is saturated with read requests. The quantity of write requests can indicate whether the back-end is saturated with write requests.

In various examples, a request can be received at the front-end of the memory sub-system from a host coupled to the memory sub-system. The request can be stored in a buffer of the front-end of the memory sub-system. The buffer can be located in a controller of the front-end of the memory sub-system. A number of credits corresponding to a quantity of requests stored in the buffer can be updated responsive to storing a quantity of request in the buffer.

Responsive to determining that a quantity of outstanding requests stored in the different buffer of the back-end of the memory sub-system is greater than a threshold, Instructions of a computer readable medium can be executable by the processor to refrain from providing a response comprising the number of credits. Responsive to determining that the quantity of outstanding requests is less than the threshold but greater than a different threshold after the quantity of outstanding requests had previously been greater than the threshold, the instructions can be executable by the processor to refrain from providing the response comprising the number of credits, where the different threshold is less than the threshold. Responsive to determining that the quantity of outstanding requests is less than the different threshold, the instructions can be executable by the processor to provide the response comprising the number of credits to the host. The response can include the credits. The credits can indicate whether the host can provide additional requests to the memory sub-system. The threshold can be greater than the different threshold. The response can be one of a data response (DRS) and a non-data response (NDR). The instructions can be executable by the processor to provide the response via a comput express link (CXL) coupling the host to the memory sub-system.

Figure 6:
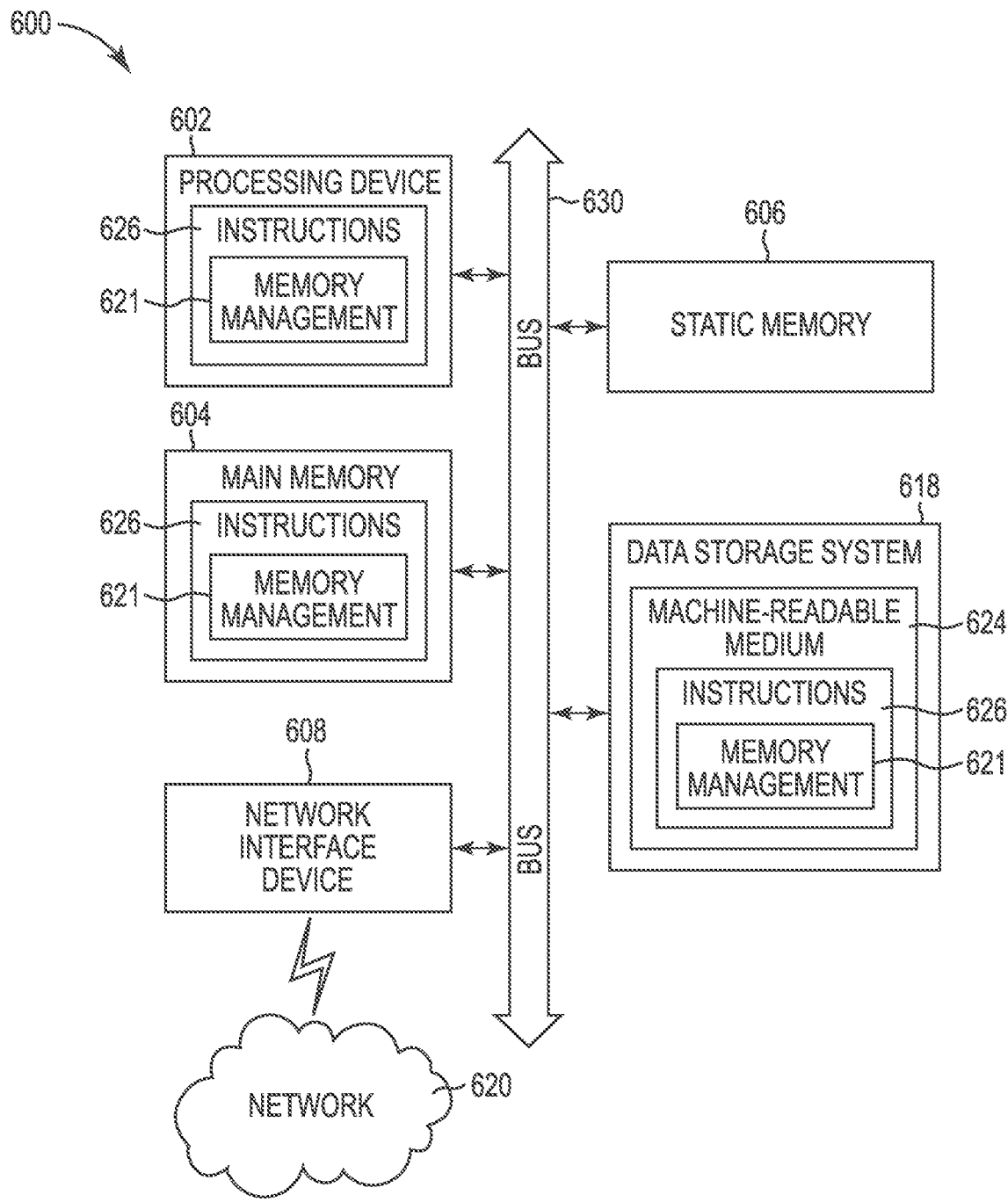
FIG. 6 is a block diagram of an example computer system in which embodiments of the present disclosure may operate.

FIG. 6 is a block diagram of an example computer system 600 in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a front-end of the memory sub-system (e.g., front-end 121 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a front-end of the memory sub-system (e.g., the front-end 121 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
providing a request, from a front-end of a memory sub-system, to a back-end of the memory sub-system;
deleting the request from a buffer of the front-end of the memory sub-system;
responsive to deleting the request from the buffer and providing the request to the back-end, determining a quantity of outstanding requests in the back-end of the memory sub-system; and
determining whether to provide a response to a host, based on a comparison of the quantity of outstanding requests to a threshold.

2. The method of claim 1, further comprising, responsive to determining that the quantity of outstanding requests in the back-end is greater than the threshold, refraining from providing the response.

3. The method of claim 1, further comprising, responsive to determining that the quantity of outstanding requests in the back-end is less than the threshold but greater than a different threshold after the quantity of outstanding requests had previously been greater than the threshold, refraining from providing the response.

4. The method of claim 1, further comprising, responsive to determining that the quantity of outstanding requests in the back-end is less than the threshold and less than a different threshold after the quantity of requests had previously been greater than the threshold, providing the response to the host.

5. The method of claim 1, further comprising, responsive to determining to provide the response, providing the response to the host, wherein the response indicates whether the host can provide additional requests to the memory sub-system based on a different quantity of requests of the buffer of the front end and the quantity of requests.

6. The method of claim 1, further comprising receiving the request at the front-end of the memory sub-system.

7. The method of claim 6, wherein the request is received from the host coupled to the memory sub-system via a CXL link.

8. The method of claim 6, further comprising storing, responsive to receipt of the request, the request in the buffer of the front-end of the memory sub-system.

9. The method of claim 8, further comprising, responsive to storing the request in the buffer, incrementing a different count representative of a different quantity of requests in the buffer.

10. The method of claim 9, wherein the response includes a count from the different count as the indication of the different quantity of requests in the buffer.

11. An apparatus, comprising:
a processing device of a front-end of a memory sub-system, configured to:
provide a request, from the front-end of the memory sub-system, to a back-end of the memory sub-system;
delete the request from a buffer of the processing device of the front-end of the memory sub-system;
responsive to deleting the request from the buffer and providing the request to the back-end, determine a quantity of read requests in the back-end and a quantity of write requests in the back-end;
responsive to deleting the request from the buffer and providing the request to the back-end, determine whether the quantity of read requests is greater than a first threshold or whether the quantity of write requests is greater than a second threshold; and
responsive to determining that the quantity of read requests is less than the first threshold and that the quantity of write requests is less than the second threshold, provide, to a host, an indication of the quantity of requests stored in the buffer.

12. The apparatus of claim 11, wherein the processing device is further configured to:
responsive to determining that the quantity of read requests is less than the first threshold and greater than a third threshold or the quantity of write requests is less than the second threshold and greater than a fourth threshold, refrain from providing the indication of the quantity of requests stored in the buffer to the host if the quantity of read requests was previously greater than the first threshold or the quantity of write requests was previously greater than the second threshold.

13. The apparatus of claim 11, wherein the processing device is further configured to:
responsive to determining that the quantity of read requests is less than the first threshold and less than a third threshold and the quantity of write requests is less than the second threshold and less than a fourth threshold, provide a number of credits corresponding to the quantity of requests stored in the buffer of the front-end.

14. The apparatus of claim 13, wherein the processing device is further configured to provide a response comprising the number of credits as metadata.

15. The apparatus of claim 14, wherein the processing device is further configured to provide the response responsive to receipt of the request.

16. The apparatus of claim 14, wherein the processing device is further configured to provide the response responsive to receipt of a different request.

17. A non-transitory computer readable medium having computer readable instructions stored thereon that are executable by a processor to:
receive a request, at the front-end of the memory sub-system, from a host coupled to the memory sub-system;
store the request in a buffer of the front-end of the memory sub-system;
responsive to storing the request in the buffer, update a number of credits corresponding to a quantity of requests stored the buffer; and
responsive to determining that a quantity of outstanding requests is less than a threshold, provide a response comprising the number of credits to the host, wherein the credits indicates whether the host provides additional requests to the memory sub-system.

18. The non-transitory computer readable medium of claim 17, wherein the threshold is greater than a different threshold.

19. The non-transitory computer readable medium of claim 17, wherein the response is one of a data response (DRS) and a non-data response (NDR).

20. The non-transitory computer readable medium of claim 17, wherein the instructions are executable by the processor to provide the response via a compute express link (CXL) coupling the host to the memory sub-system.

* * * * *